US011872982B2

(12) United States Patent
Inoue et al.

(10) Patent No.: US 11,872,982 B2
(45) Date of Patent: Jan. 16, 2024

(54) PARKING ASSISTANCE DEVICE

(71) Applicants: Toyota Jidosha Kabushiki Kaisha, Toyota Aichi-ken (JP); Aisin Seiki Kabushiki Kaisha, Kariya (JP)

(72) Inventors: Kota Inoue, Toyota (JP); Yuki Minase, Toyota (JP); Takuya Nakagawa, Miyoshi (JP); Hiroyuki Tachibana, Kariya (JP); Norio Imai, Kariya (JP); Nozomu Maeda, Kariya (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 656 days.

(21) Appl. No.: 16/825,160

(22) Filed: Mar. 20, 2020

(65) Prior Publication Data
US 2020/0298839 A1    Sep. 24, 2020

(30) Foreign Application Priority Data

Mar. 22, 2019 (JP) .................. 2019-054291

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/18* (2013.01); *B60W 10/20* (2013.01);
(Continued)

(58) Field of Classification Search
CPC ...... B60W 30/06; B60W 10/04; B60W 10/18; B60W 10/20; B60W 50/14;
(Continued)

(56) References Cited

U.S. PATENT DOCUMENTS

2010/0049402 A1* 2/2010 Tanaka .................. B60R 1/00
701/41
2017/0259850 A1* 9/2017 Yamashita ............ B62D 6/00
(Continued)

FOREIGN PATENT DOCUMENTS

EP          3124361 A1 *  2/2017  ......... B62D 15/0285
JP       2004-284530 A    10/2004
(Continued)

OTHER PUBLICATIONS

Notice of Allowance issued in corresponding U.S. Appl. No. 16/445,956 dated Nov. 10, 2021.
(Continued)

*Primary Examiner* — Jelani A Smith
*Assistant Examiner* — Paul A Castro
(74) *Attorney, Agent, or Firm* — Dinsmore & Shohl LLP

(57) ABSTRACT

A parking assistance device performs parking assistance control including steering angle control for changing a steering angle of a vehicle, driving force control for controlling a driving force of the vehicle, and braking force control for controlling a braking force of the vehicle. The parking assistance device notifies an occupant of a driving operation to be performed by the occupant, including a moving operation on a shift lever and an operation on a brake pedal when the vehicle reaches a switching position where a traveling direction of the vehicle is to be switched during performing the parking assistance control. When the driving operation is performed by the occupant, the parking assistance device restarts the parking assistance control at a timing when the occupant stops the operation on the brake pedal.

6 Claims, 6 Drawing Sheets

(51) Int. Cl.
  *B60W 10/18* (2012.01)
  *B60W 50/14* (2020.01)
  *B60W 10/20* (2006.01)

(52) U.S. Cl.
  CPC ......... *B60W 50/14* (2013.01); *B60W 2540/12* (2013.01); *B60W 2552/53* (2020.02)

(58) Field of Classification Search
  CPC ......... B60W 2540/12; B60W 2552/53; B60W 60/001; B62D 15/0285; B62D 1/02; B62D 15/028; G01B 11/026; G01C 21/3605; G01C 21/343; G08G 1/168; G08G 1/096716; G08G 1/096725
  See application file for complete search history.

(56) References Cited

U.S. PATENT DOCUMENTS

2020/0001864 A1    1/2020  Oyama et al.
2021/0356279 A1*  11/2021  Szigeti ............... G01C 21/3407

FOREIGN PATENT DOCUMENTS

| | | |
|---|---|---|
| JP | 2006-321291 A | 11/2006 |
| JP | 2009-166686 A | 7/2009 |
| JP | 2012-076551 A | 4/2012 |
| JP | 2015-003565 A | 1/2015 |
| JP | 2018-135028 A | 8/2018 |
| WO | 2008/140104 A1 | 11/2008 |

OTHER PUBLICATIONS

Notice of Allowability issued to U.S. Appl. No. 16/445,956 dated Jan. 25, 2022.
Keisuke Oyama et al., U.S. Appl. No. 16/445,956 filed Jun. 19, 2019.
Office Action issued to U.S. Appl. No. 16/445,956 dated Jun. 10, 2021.

* cited by examiner

PARKING ASSISTANCE DEVICE

CROSS-REFERENCE TO RELATED APPLICATION

This application claims priority to Japanese Patent Application No. 2019-054291 filed on Mar. 22, 2019, which is incorporated herein by reference in its entirety.

BACKGROUND

1. Technical Field

The disclosure relates to a parking assistance device that performs parking assistance control for parking a vehicle in a predetermined place, unparking a vehicle out of a parking place, or parking a vehicle in a predetermined place and then unparking the vehicle out of the place.

2. Description of Related Art

In the related art, a parking assistance device has been disclosed that detects surrounding conditions of a vehicle by using ambient sensors, such as "a camera and a sensor", and performs parking assistance control such that the vehicle moves along a movement path that is set according to the detected surrounding conditions (for example, Japanese Unexamined Patent Application Publication No. 2018-135028 (JP 2018-135028 A)). The device disclosed in JP 2018-135028 A (hereinafter, referred to as the "device in the related art") performs a steering angle control for controlling a steering angle of a vehicle as parking assistance control. Therefore, even when the device in the related art performs the parking assistance control, a driver needs to operate the accelerator pedal and the brake pedal and move the shift lever.

SUMMARY

Meanwhile, the inventors of the present application are studying a parking assistance device that performs parking assistance control including driving force control for controlling a driving force of a vehicle and braking force control for controlling a braking force of the vehicle, as well as the steering angle control, when a driver is parking or unparking the vehicle in or from a predetermined place. Even in the above parking assistance device, the driver needs to do some operation by the driver themselves. For example, the driver has to move the shift lever.

For example, it is assumed that a vehicle has reached a traveling direction switching position on a movement path of a vehicle. The traveling direction switching position is a position where the traveling direction of the vehicle switches from forward to backward or vice versa (that is, the position where the vehicle is temporarily stopped to allow the driver to switch the position of the shift lever). At this time, sudden start of the vehicle after the driver moves the shift lever may make the driver feel uncomfortable.

The disclosure is to provide a parking assistance device capable of restarting (continuing) parking assistance control at a timing intended by a driver after the driver moves a shift lever when a vehicle reaches a traveling direction switching position on a movement path during the parking assistance control for performing steering angle control, driving force control and braking force control.

An aspect of the disclosure relates to a parking assistance device. The parking assistance device includes an information acquisition unit (80, 81, 82, 83) configured to acquire vehicle surrounding information including information on objects that are present around a vehicle and information on partitioning lines on a road surface around the vehicle and a parking assistance electric control unit. The parking assistance electric control unit (10) includes a path decision unit (10X) configured to decide a target area (Fp) that is occupied by the vehicle when parking or unparking of the vehicle is completed, based on the vehicle surrounding information, and decide a path allowing the vehicle to move from a current position of the vehicle to the target area as a movement path, and a parking assistance unit (10Y) configured to perform parking assistance control including steering angle control for changing a steering angle of the vehicle, driving force control for controlling a driving force of the vehicle and braking force control for controlling a braking force of the vehicle such that the vehicle moves from the current position to the target area along the decided movement path.

The path decision unit is configured to set a first path (LtgtA) and a second path (LtgtB) as the movement path when the vehicle is not possible to be moved to the target area by one backward or forward travel, the first path (LtgtA) allowing the vehicle to move from the current position to a traveling direction switching position (Psw) where a traveling direction of the vehicle is switched, the second path (LtgtB) allowing the vehicle to move from the traveling direction switching position (Psw) to the target area. The parking assistance unit is configured to, when the vehicle reaches the traveling direction switching position during performing the parking assistance control (YES in step S303), notify an occupant of a driving operation to be performed by the occupant with respect to the parking assistance control, including a moving operation on a shift lever and an operation on a brake pedal (step S304, step S502), monitor whether or not the driving operation is performed by the occupant within a predetermined period (Tm1) after the notification (step S503), restart the parking assistance control (step S308) at a timing (YES in steps S306 and S307) when the occupant stops the operation on the brake pedal, when the driving operation is performed by the occupant within the predetermined period (Tm1) (YES in step S503), and end the parking assistance control (steps S309 and S310), when the driving operation is not performed by the occupant within the predetermined period (Tm1) (NO in step S503, YES in step S504, and NO in step S305).

The parking assistance device according to the aspect of the disclosure having such a configuration notifies the occupant of the driving operation including the moving operation on the shift lever and the operation on the brake pedal at the time when the vehicle reaches the traveling direction switching position. Then, when the driving operation is performed by the occupant within the predetermined period, the parking assistance device according to the aspect of the disclosure restarts the parking assistance control at the timing when the occupant stops (releases) the operation on the brake pedal. Therefore, it is possible to start the vehicle from the traveling direction switching position at the timing intended by the occupant.

In the parking assistance device according to the aspect of the disclosure, the parking assistance electric control unit (10) may be configured to perform the braking force control for applying a braking force to the vehicle to stop the vehicle, after a time when the vehicle reaches the traveling direction switching position (Psw) during performing the parking assistance control, and the parking assistance unit (10Y) may be configured to restart the parking assistance control at a timing when the occupant stops the operation on the brake pedal and the parking assistance electric control unit (10) may be configured to perform the braking force control for releasing the application of the braking force.

In the parking assistance device according to the aspect of the disclosure, the notifying of the occupant of the driving operation including the moving operation on the shift lever and the operation on the brake pedal may include displaying a first message requesting the moving operation of the shift lever on a display device (73) and causing a speaker (92) to speak the first message, and displaying a second message requesting the operation on the brake pedal on the display device (73) and causing the speaker (92) to speak the second message.

In the above description, in order to facilitate understanding of the disclosure, names and/or symbols used in embodiments of the disclosure to be described later are attached in parentheses to configurations corresponding to the embodiments. However, each component of the disclosure is not limited to the embodiments defined by the names and/or symbols.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described with reference to the accompanying drawings. A parking assistance device according to an embodiment of the disclosure (hereinafter, it is sometimes referred to as "the present parking assistance device") is applied to a vehicle. The vehicle, on which the present parking assistance device is mounted, is sometimes referred to as the "host vehicle" to distinguish the present vehicle from other vehicles.

Figure 1:
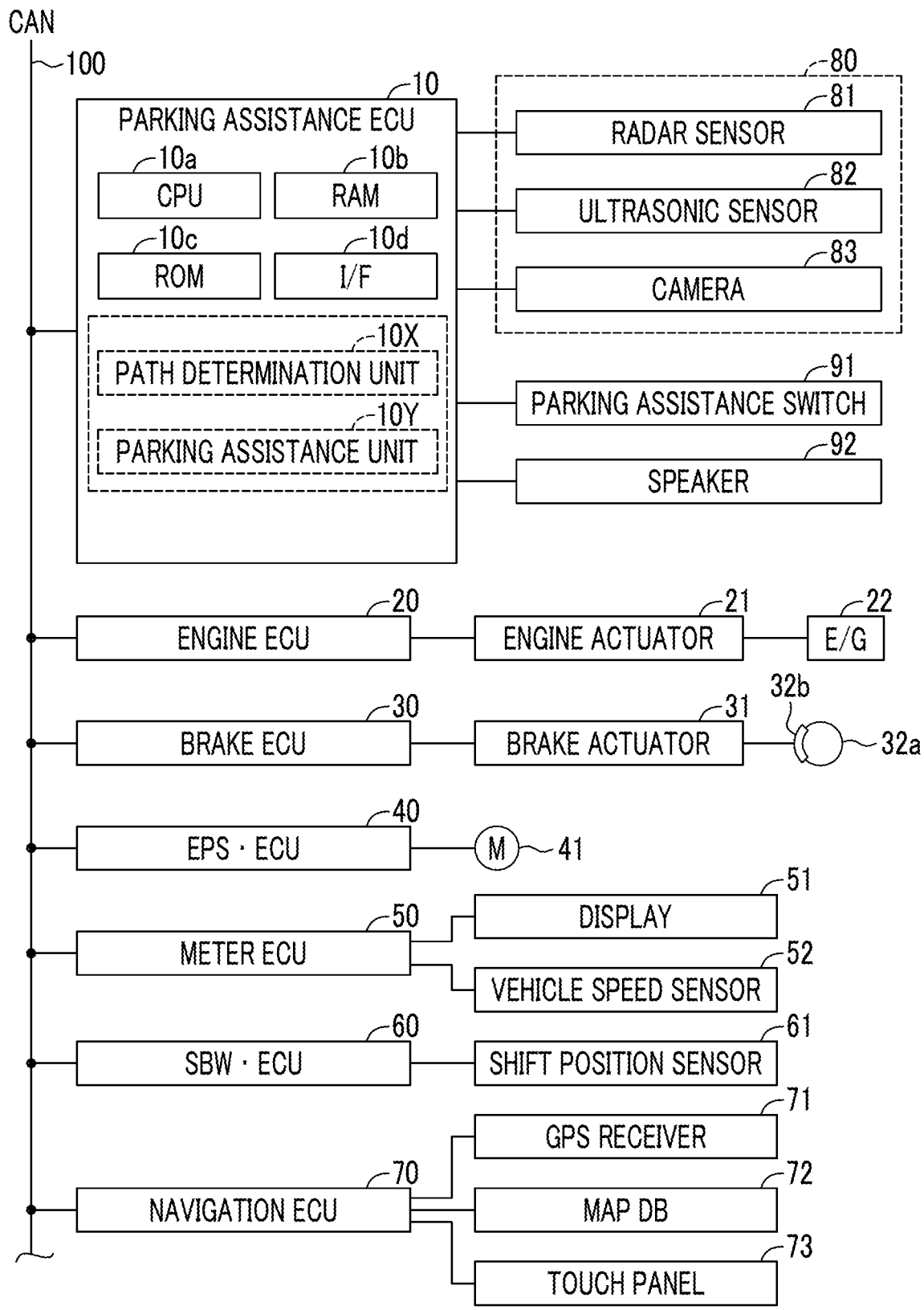
FIG. 1 is a schematic configuration diagram of a parking assistance device according to an embodiment of the disclosure.

As shown in FIG. 1, the present parking assistance device includes a parking assistance ECU 10. The parking assistance ECU 10 includes a microcomputer including a central processing unit (CPU) 10a, a random-access memory (RAM) 10b, a read-only memory (ROM) 10c, an interface (I/F) 10d, and the like. In the specification, "ECU" stands for electric control unit. The ECU includes a microcomputer including a CPU, a RAM, a ROM, an interface, and the like. The CPU implements various functions by executing the instructions stored in the ROM.

The parking assistance ECU 10 is connected to an engine ECU 20, a brake ECU 30, an electric power steering ECU (hereinafter, referred to as an "EPS ECU") 40, a meter ECU 50, a shift-by-wire (SBW) ECU 60, and a navigation ECU 70 through a controller area network (CAN) 100. The above-mentioned ECUs are connected through the CAN 100 such that information can be transmitted and received to and from one another. Therefore, a detection value of a sensor connected to a specific ECU is transmitted to another ECU.

The engine ECU 20 is connected to an engine actuator 21. The engine actuator 21 includes a throttle valve actuator that changes the throttle valve opening degree of an internal combustion engine 22. The engine ECU 20 can change the torque generated by the internal combustion engine 22 by driving the engine actuator 21. Therefore, the engine ECU 20 can control the driving force of the vehicle by controlling the engine actuator 21.

When the vehicle is a hybrid vehicle, the engine ECU 20 can control the driving force of the vehicle generated by one or both of the "internal combustion engine and an electric motor" as the vehicle driving source. Further, when the vehicle is an electric vehicle, the engine ECU 20 can control the driving force of the vehicle generated by the electric motor as the vehicle driving source.

The brake ECU 30 is connected to a brake actuator 31. The braking force (braking torque) exerted on wheels is controlled by the brake actuator 31. The brake actuator 31 adjusts a hydraulic pressure supplied to wheel cylinders built in brake calipers 32b according to an instruction from the brake ECU 30, and a friction braking force is generated by tightly pressing brake pads against brake discs 32a by the hydraulic pressure. Therefore, the brake ECU 30 can control the braking force of the vehicle by controlling the brake actuator 31.

The EPS ECU 40 is connected to an assist motor (M) 41. The assist motor 41 is incorporated in a "steering mechanism of the vehicle including a steering wheel, a steering shaft connected to the steering wheel, a steering gear mechanism, and the like" (not shown). The EPS ECU 40 detects a steering torque input to the steering wheel by the driver with a steering torque sensor (not shown) provided on the steering shaft, and drives the assist motor 41 based on the steering torque. The EPS ECU 40 can apply a steering torque (steering assist torque) to the steering mechanism by driving the assist motor 41, whereby the driver can be assisted in the steering operation.

In addition, the EPS ECU 40 drives the assist motor 41 based on the steering torque specified by a steering command when the steering command is received from the parking assistance ECU 10 through the CAN 100 during performing the parking assistance control to be described later. The steering torque is different from the above-mentioned steering assist torque, and represents the torque applied to the steering mechanism by the steering command from the parking assistance ECU 10 without the need for the steering operation of the driver. This torque changes the rotation angle of the steering wheel of the vehicle (that is, the steering angle).

The meter ECU 50 is connected to a display 51 and a vehicle speed sensor 52. The display 51 is a multi-information display provided in front of the driver's seat. The display 51 displays various information in addition to displaying measured values such as a vehicle speed and an engine rotation speed. It is noted that a head-up display may be employed as the display 51. The vehicle speed sensor 52 detects the speed (vehicle speed) of the vehicle and outputs a signal indicating the vehicle speed to the meter ECU 50. The vehicle speed detected by the vehicle speed sensor 52 is also transmitted to the parking assistance ECU 10.

The SBW ECU 60 is connected to a shift position sensor 61. The shift position sensor 61 detects a position of a shift lever as a movable part of a shift operation unit. In the embodiment, the position of the shift lever includes a parking position (P), a forward position (D), and a reverse position (R). The SBW ECU 60 receives the position of the shift lever from the shift position sensor 61, and controls at least one of a transmission (not shown) or a drive direction switching mechanism of the vehicle (that is, performs shift control of the vehicle) based on the position of the shift lever.

The navigation ECU 70 includes a global positioning system (GPS) receiver 71 receiving a GPS signal for detecting "latitude and longitude" of a place where the vehicle is positioned, a map database 72 storing map information, and a touch panel 73. The navigation ECU 70 processes various calculations based on the latitude and longitude of the place where the vehicle is positioned, map information, and the like, and causes the touch panel 73 to display the position of the vehicle on the map. Hereinafter, a display mode in which "a map and the position of the vehicle on the map" are displayed on the touch panel 73 is referred to as "a navigation mode". The touch panel 73 is a touch panel display and can display a map, an image, and the like.

The display mode of the touch panel 73 includes a parking assistance mode in addition to the navigation mode. The parking assistance mode is a display mode which is used when the parking assistance control is performed for parking or unparking and in which various images representing the surrounding conditions of the vehicle are displayed. When a request for assistance is issued, which will be described later, the display mode is switched from the navigation mode to the parking assistance mode.

An ambient sensor 80 is connected to the parking assistance ECU 10. The ambient sensor 80 acquires vehicle surrounding information. The vehicle surrounding information includes information on three-dimensional objects that are present around the vehicle and information on partitioning lines on a road surface around the vehicle. The three-dimensional object represents, for example, a moving object such as a vehicle, a pedestrian and bicycles, and a fixed object such as a guardrail and a fence. The ambient sensor 80 includes a radar sensor 81, an ultrasonic sensor 82, and a camera 83.

The ambient sensor 80 may be referred to as an "information acquisition unit that acquires vehicle surrounding information". Further, the vehicle does not need to include all of the radar sensor 81, the ultrasonic sensor 82, and the camera 83 as the ambient sensor 80, and may include at least one of the sensors 81 to 83.

The radar sensor 81 includes a radar transceiver and a signal processing unit (not shown). The radar transceiver radiates a radio wave in a millimeter wave band (hereinafter, referred to as a "millimeter wave") to a surrounding area of the vehicle, and receives a millimeter wave (that is, a reflected wave) reflected by a three-dimensional object that is present within a radiation range. The signal processing unit acquires information indicating the distance between the vehicle and the three-dimensional object, the relative speed of the vehicle with respect to the three-dimensional object, the relative position (direction) of the three-dimensional object with respect to the vehicle, or the like based on the phase difference between the transmitted millimeter wave and the received reflected wave, the attenuation level of the reflected wave, the time from when the millimeter wave is transmitted to when the reflected wave is received, and the like, and outputs the acquired information to the parking assistance ECU 10.

The ultrasonic sensor 82 transmits an ultrasonic wave in a pulse form to a predetermined range around the vehicle, and receives the reflected wave reflected by the three-dimensional object. The ultrasonic sensor 82 acquires information indicating "a reflection point, which is a point on the three-dimensional object where the transmitted ultrasonic wave is reflected", "the distance to the ultrasonic sensor" and the like, based on the time from transmission to reception of the ultrasonic wave. The ultrasonic sensor 82 outputs the acquired information to the parking assistance ECU 10.

The camera 83 is, for example, a digital camera incorporating a charge coupled device (CCD) or a CMOS image sensor (CIS). The camera 83 outputs image data of the surrounding area of the vehicle at a predetermined frame rate. The camera 83 captures images showing surrounding conditions of the vehicle to be checked (including the position and shape of the three-dimensional object and the position and shape of the partitioning line) when the vehicle is parking or unparking, and outputs the image data to the parking assistance ECU 10.

The parking assistance ECU 10 receives information from each of the radar sensor 81 and the ultrasonic sensor 82 each time a predetermined time (for convenience, also referred to as a "first predetermined time") elapses. The parking assistance ECU 10 plots the information (that is, the position of the reflection point which is a point where the millimeter wave is reflected and the position of the reflection point which is a point where the ultrasonic wave is reflected) on a two-dimensional map. The two-dimensional map is a plan view with the position of the vehicle as an original point, the traveling direction of the vehicle as the X axis, and the left direction of the vehicle as the Y axis. The position of the vehicle is the center of the right and left front wheels in plan view. "The position of the vehicle" may be another specific position on the vehicle (for example, the center of the right and left rear wheels in plan view, or the geometric center of the vehicle in plan view). The parking assistance ECU 10 detects the three-dimensional object around the vehicle based on the shape of a group of reflection points on the two-dimensional map, and specifies the position (distance and orientation) and the shape of the three-dimensional object with respect to the vehicle.

Further, the parking assistance ECU 10 acquires image data from the camera 83 each time the first predetermined time elapses. The parking assistance ECU 10 detects the three-dimensional object around the vehicle by analyzing the image data from the camera 83, and specifies the position (distance and direction) and the shape of the three-dimensional object with respect to the vehicle. The parking assistance ECU 10 draws, on the two-dimensional map described above, the three-dimensional object specified (detected) based on the image data. Therefore, the parking assistance ECU 10 can detect the three-dimensional object that is present around the vehicle (within a predetermined distance from the position of the vehicle) based on the information shown on the two-dimensional map.

The parking assistance ECU 10 detects an "area where the three-dimensional object is not present" around the vehicle based on the information shown on the two-dimensional map. When the area where the three-dimensional object is not present is an area having a size and shape that allows the vehicle to park (or unpark) with a margin, the parking assistance ECU 10 decides the area as a "parking available area (or unparking available area)". When the partitioning line that partitions the parking areas is detected around the vehicle, the parking available area is a rectangle that does not straddle the partitioning line, and an area in which the long side of the rectangle is larger than the length of the vehicle in the front-rear direction of the vehicle by a first margin, and the short side thereof is larger than the width of the vehicle in the right-left direction of the vehicle by a second margin.

A parking assistance switch 91 and a speaker 92 are further connected to the parking assistance ECU 10. The parking assistance switch 91 is a switch that is operated (pressed) when the driver requests the parking assistance ECU 10 to perform parking assistance control (when a request for assistance is issued). The speaker 92 generates sound when a speaking command is received from the parking assistance ECU 10.

Details of Parking Assistance Control

The parking assistance ECU 10 monitors the position of the shift lever and the operation of the parking assistance switch 91, and selects one of a perpendicular parking mode, a parallel parking mode, and an unparking mode as the assistance mode.

For example, when the position of the shift lever is in "D" and the parking assistance switch 91 is pressed once, the perpendicular parking mode is selected as the assistance mode. When the position of the shift lever is in "D" and the parking assistance switch 91 is pressed twice, the parallel parking mode is selected as the assistance mode. When the position of the shift lever is in "P" and the parking assistance switch 91 is pressed once, the unparking mode is selected as the assistance mode.

The perpendicular parking mode is a mode for providing assistance when the vehicle is being parked in parallel with other vehicles. Perpendicular parking is synonymous with parking the vehicle in a direction perpendicular to the traveling direction of a travel road. More specifically, the perpendicular parking means that the host vehicle is parked such that one side of the vehicle (host vehicle) faces one side of another vehicle (first other vehicle) and the other side of the host vehicle faces one side of yet another vehicle (second other vehicle), and the axis in the front-rear direction of the host vehicle that passes through the center of the host vehicle in the vehicle-width direction is parallel with respective axes in front-rear directions of the first and second other vehicles that pass through the centers of the first and second other vehicles in the vehicle-width directions. In the perpendicular parking, the host vehicle is parked such that the host vehicle is in a direction perpendicular to the traveling direction of the travel road and at least one of the right and left sides of the host vehicle is parallel with a "white lane, wall, fence, guardrail, or the like".

The parallel parking mode is a mode for providing assistance when the vehicle is being parked in parallel. The parallel parking is synonymous with parking the vehicle in parallel to the traveling direction of the travel road. More specifically, the parallel parking means that the host vehicle is parked such that the front end of the host vehicle faces the rear end (or front end) of the first other vehicle and the rear end of the host vehicle faces the front end (or rear end) of the second other vehicle, and the axis in the front-rear direction of the host vehicle that passes through the center of the host vehicle in the vehicle-width direction is substantially on the same straight line as respective axes in front-rear directions of the first and second other vehicles that pass through the centers of the first and second other vehicles in the vehicle-width directions.

The unparking mode is a mode for providing assistance when the vehicle is being unparked in the parking area. Specifically, the unparking mode is a mode for providing assistance when a parallel-parked vehicle is being moved to the travel road.

Request for Assistance

The parking assistance ECU 10 monitors the operation of the parking assistance switch 91, the position of the shift lever, the surrounding conditions of the vehicle, and the like, and determines whether or not a request for assistance is issued as described later. The request for assistance includes a request for perpendicular parking assistance, a request for the parallel parking assistance, and a request for unparking assistance.

1. Request for Perpendicular Parking Assistance

The parking assistance ECU 10 determines that the request for perpendicular parking assistance is issued when all the following conditions are satisfied.
(Condition A1) No request for assistance has been issued.
(Condition A2) The perpendicular parking mode is selected. That is, in a situation in which the position of the shift lever is in the forward position (D), the parking assistance switch 91 is pressed once.
(Condition A3) The vehicle speed at the time when Condition A2 is satisfied is equal to or lower than a predetermined low speed determination vehicle speed (for example, 30 km/h).
(Condition A4) An area adjacent to the travel road and having a size and a shape in which a vehicle can be parked in perpendicular parking (perpendicular parking available area) is detected.

2. Request for Parallel Parking Assistance

The parking assistance ECU 10 determines that the request for parallel parking assistance is issued when all the following conditions are satisfied.
(Condition B1) No request for assistance has been issued.
(Condition B2) The parallel parking mode is selected. In a situation in which the position of the shift lever is in the forward position (D), the parking assistance switch 91 is pressed twice continuously within a predetermined time.
(Condition B3) The vehicle speed at the time when Condition B2 is satisfied is equal to or lower than a predetermined low speed determination vehicle speed (for example, 30 km/h).
(Condition B4) An area adjacent to the travel road and having a size and a shape in which a vehicle can be parked in parallel parking (parallel parking available area) is detected.

3. Request for Unparking Assistance

The parking assistance ECU 10 determines that the request for unparking assistance is issued when all the following conditions are satisfied.
(Condition C1) No request for assistance has been issued.

(Condition C2) The unparking mode is selected. That is, in a situation in which the position of the shift lever is in the parking position (P), the parking assistance switch 91 is pressed once.

(Condition C3) The vehicle speed at the time when Condition C2 is satisfied is a predetermined stop determination vehicle speed (for example, 0 km/h).

(Condition C4) An area in the travel road adjacent to the area where the vehicle is parked and having a size and a shape in which a vehicle can be present (unparking available area) is detected.

When the request for perpendicular parking assistance is issued, the parking assistance ECU 10 performs parking assistance control in the perpendicular parking mode.

When the request for parallel parking assistance is issued, the parking assistance ECU 10 performs parking assistance control in the parallel parking mode.

When the request for unparking assistance is issued, the parking assistance ECU 10 performs the parking assistance control in the unparking mode.

The above parking assistance controls are the same as each other except that the areas (target areas) where the vehicle is to be finally moved are different from each other.

When the parking assistance ECU 10 determines that the request for assistance (any of the request for perpendicular parking assistance, the request for parallel parking assistance, and the request for unparking assistance) is issued, the parking assistance ECU 10 sets the target area. The target area is an area occupied by the vehicle body when parking (unparking) of the vehicle is completed. The target area is set within a parking available area (or unparking available area). Further, the parking assistance ECU 10 sets, as a target position, the position of the vehicle when the vehicle is moved to the target area. Here, the target position is a position where the above-described "position of the vehicle" is to finally arrive.

The parking assistance ECU 10 calculates the movement path for moving the vehicle from the current position to the target position. The movement path is a path that allows the vehicle to move from the current position to the target position while the vehicle body of the vehicle is separated from the three-dimensional object (another vehicle, curbstones, a guardrail, and the like) by a predetermined distance. The movement path is calculated by one of various known calculation methods (for example, a method disclosed in Japanese Unexamined Patent Application Publication No. 2015-3565 (JP 2015-3565 A)).

When it is not possible to move the vehicle to the target position by moving the vehicle backward (forward) just once, the parking assistance ECU 10 calculates the movement path as described below. For example, the parking assistance ECU 10 calculates a first path that allows the vehicle to move forward from the current position to the traveling direction switching position (that is, a position where the vehicle temporarily stops to switch the traveling direction of the vehicle) and a second path that allows the vehicle to move backward from the traveling direction switching position to the target position.

When the movement path is decided, the parking assistance ECU 10 decides "the movement direction (specifically, the position of the shift lever), the steering angle pattern, and the speed pattern of the vehicle" to move the vehicle along the movement path.

The parking assistance ECU 10 requests the driver to move the shift lever by at least one of a screen display or voice according to the decided position of the shift lever. When the driver performs the shift lever moving operation, the parking assistance ECU 10 performs steering angle control, driving force control, and braking force control as the parking assistance control.

More specifically, the steering angle pattern is data associating the position of the vehicle on the movement path with the steering angle, and indicates a steering angle (a target value of the steering angle) when the vehicle moves along the movement path. The parking assistance ECU 10 transmits a steering command (including the target steering angle) to the EPS ECU 40 through the CAN 100 according to the decided steering angle pattern. When the steering command is received from the parking assistance ECU 10, the EPS ECU 40 drives the assist motor 41 based on the steering torque specified by the steering command to make the actual steering angle coincide with the target steering angle (that is, the steering angle control is performed).

The speed pattern is data associating the position of the vehicle on the movement path with the traveling speed, and indicates the vehicle speed (traveling speed) when the vehicle moves along the movement path. The speed pattern is set such that the vehicle speed coincides with a predetermined final target vehicle speed at the time when the position of the vehicle reaches the target position. The final target vehicle speed may be zero. The parking assistance ECU 10 transmits a driving force control command to the engine ECU 20 through the CAN 100 according to the decided speed pattern. When the driving force control command is received from the parking assistance ECU 10, the engine ECU 20 controls the engine actuator 21 according to the driving force control command (that is, the driving force control is performed). Further, the parking assistance ECU 10 transmits a braking force control command to the brake ECU 30 through the CAN 100 according to the decided speed pattern. When the braking force control command is received from the parking assistance ECU 10, the brake ECU 30 controls the brake actuator 31 according to the braking force control command (that is the braking force control is performed).

As described above, the parking assistance ECU 10 has "a path decision unit 10X that decides a movement path" and "a parking assistance unit 10Y that performs parking assistance control including steering angle control for changing a steering angle of the vehicle, driving force control for controlling a driving force of the vehicle, and braking force control for controlling a braking force of the vehicle", which are functionally implemented by the CPU 10a.

Overview of Operation

An overview of operations of the present parking assistance device will be described. The present parking assistance device notifies the driver of a driving operation to be performed by the driver with respect to the parking assistance control by using at least one of the screen display or sound, at the time when the vehicle reaches the traveling direction switching position. The driving operation includes a moving operation on the shift lever and an operation on the brake pedal. The present parking assistance device monitors whether or not the driving operation is performed by the driver within a predetermined period after the notification. When the driving operation is performed by the driver within the predetermined period, the present parking assistance device restarts the parking assistance control at a timing when the driver stops the operation on the brake pedal.

With the present parking assistance device, by making the driver perform both the moving operation on the shift lever and the operation on the brake pedal at the time when the vehicle reaches the traveling direction switching position, it is possible to confirm the intention of restarting (continuing) the parking assistance control to the driver. Further, since the parking assistance control is restarted at the timing when the driver stops operating the brake pedal, it is possible to start the vehicle from the traveling direction switching position at the timing intended by the driver.

Specific Operation of Perpendicular Parking Assistance

Next, a specific operation when the parking assistance control is performed for the request for perpendicular parking assistance will be described. The CPU 10a (hereinafter, simply referred to as "CPU") of the parking assistance ECU 10 is configured to execute each of routines shown in FIGS. 2 to 4 each time "a second predetermined time equal to or longer than the first predetermined time" elapses. Further, the CPU acquires vehicle surrounding information from the ambient sensor 80 and updates the two-dimensional map described above based on the vehicle surrounding information by executing a routine that is not shown each time the first predetermined time elapses.

In addition, when the ignition key switch (start switch) of the vehicle is changed from the off position to the on position, the CPU executes an initialization routine (not shown) to set values of various flags to be described below to "zero (0)" (clear flags).

Figure 2:
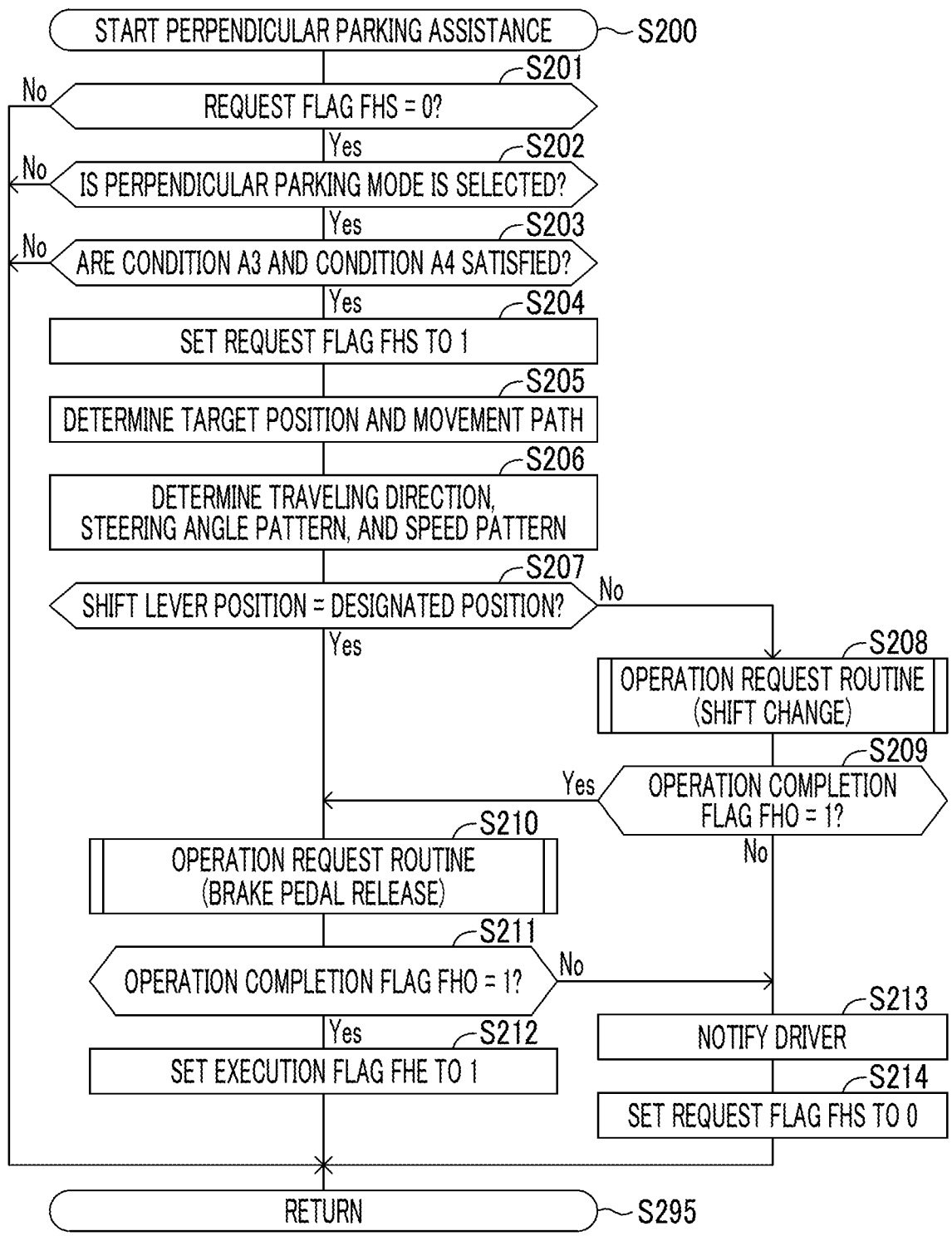
FIG. 2 is a flowchart showing a "perpendicular parking assistance starting routine" executed by a CPU of a parking assistance ECU shown in FIG. 1.

At a predetermined timing, the CPU starts a process from step S200 in FIG. 2, and the process proceeds to step S201, determining whether or not the value of an assistance request flag (hereinafter, simply referred to as "request flag") FHS is "zero (0)". The value of "0" of the request flag FHS indicates that the request for assistance (that is, any of the request for perpendicular parking assistance, the request for parallel parking assistance, and the request for unparking assistance) is not issued, and the value of "1" thereof indicates that the request for assistance is issued. In other words, the CPU determines whether or not Condition A1 described above is satisfied in step S201. When the value of the request flag FHS is not "0", the CPU determines "No" in step S201, and the process proceeds directly to step S295 to temporarily end the routine.

Now, assuming that the value of the request flag FHS is "0", the CPU determines "YES" in step S201 and the process proceeds to step S202 to determine whether or not the perpendicular parking mode is selected (whether or not Condition A2 described above is satisfied). When the perpendicular parking mode is not selected, the CPU determines "NO" in step S202, and the process proceeds directly to step S295 to temporarily end the routine.

Assuming that the perpendicular parking mode is selected, the CPU determines "YES" in step S202 and the process proceeds to step S203 to determine whether or not both Condition A3 and Condition A4 described above are satisfied. The condition that both Condition A3 and Condition A4 are satisfied is also referred to as "execution condition of perpendicular parking assistance". When the execution condition of perpendicular parking assistance is not satisfied, the CPU determines "NO" in step S203, and the process proceeds directly to step S295 to temporarily end the routine.

Figure 6:
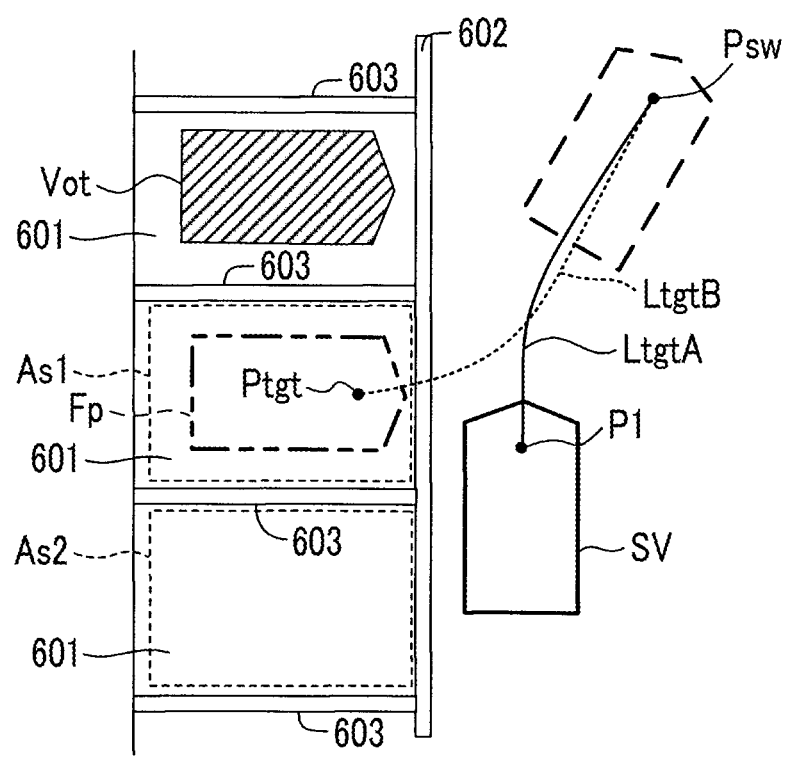
FIG. 6 is a plan view showing a situation where the parking assistance ECU calculates a "movement path including a traveling direction switching position (a position where a vehicle temporarily stops to switch a position of a shift lever)".

For example, in the example shown in FIG. 6, the position of a vehicle SV is "P1", and the vehicle speed of the vehicle SV is equal to or lower than the low speed determination vehicle speed (specifically, the vehicle SV is stopped by the driver operating the brake pedal). Further, a plurality of parking areas 601 is present around the vehicle SV. The parking areas 601 are partitioned by a first partitioning line 602 and a plurality of second partitioning lines 603. The CPU detects another vehicle Vot as an object. Therefore, the CPU detects (recognizes) a perpendicular parking available area As1 and a perpendicular parking available area As2 around the vehicle SV.

In the example of FIG. 6, since the execution condition of the perpendicular parking assistance is satisfied, the CPU determines "YES" in step S203 and the process is performed sequentially in steps S204 to S206 to be described below, and then proceeds to step S207.

Step S204: The CPU sets the value of the request flag FHS to "1".

Step S205: The CPU sets the target area for one of the detected perpendicular parking available areas. In the example of FIG. 6, the CPU sets the target area Fp in the perpendicular parking available area As1. Further, when the vehicle SV is moved to the target area Fp, the CPU sets the position of the vehicle SV as the target position Ptgt.

In addition, the CPU calculates a movement path that allows the vehicle SV to move from the current position (start position) P1 to the target position Ptgt in step S205. The movement path is a path that allows the vehicle SV to move from the start position P1 to the target position Ptgt with the body of the vehicle SV being maintained at a predetermined distance or more from objects (other vehicles, curbs, guardrails, and the like). The CPU cannot move the vehicle SV to the target position Ptgt by moving the vehicle SV backward just once, and thus decides the movement path as follows. Specifically, the CPU sets a first path LtgtA and a second path LtgtB as the movement path. The first path LtgtA is a path for moving the vehicle SV forward from the start position P1 to the traveling direction switching position Psw (that is, the position where the vehicle SV temporarily stops for changing the position of the shift lever from the forward position (D) to the reverse position (R)). The second path LtgtB is a path for moving the vehicle backward from the traveling direction switching position Psw to the target position Ptgt. Hereinafter, the traveling direction switching position may be simply referred to as "switching position".

Step S206: The CPU decides the "movement direction (specifically, the position of the shift lever), the steering angle pattern and the speed pattern of the vehicle SV" for moving the vehicle SV along the movement path.

Next, in step S207, the CPU determines whether or not the current position of the shift lever coincides with the "position designated in step S206". When the current position of the shift lever coincides with the designated position, the CPU determines "YES" in step S207 and the process proceeds to step S210.

Figure 5:
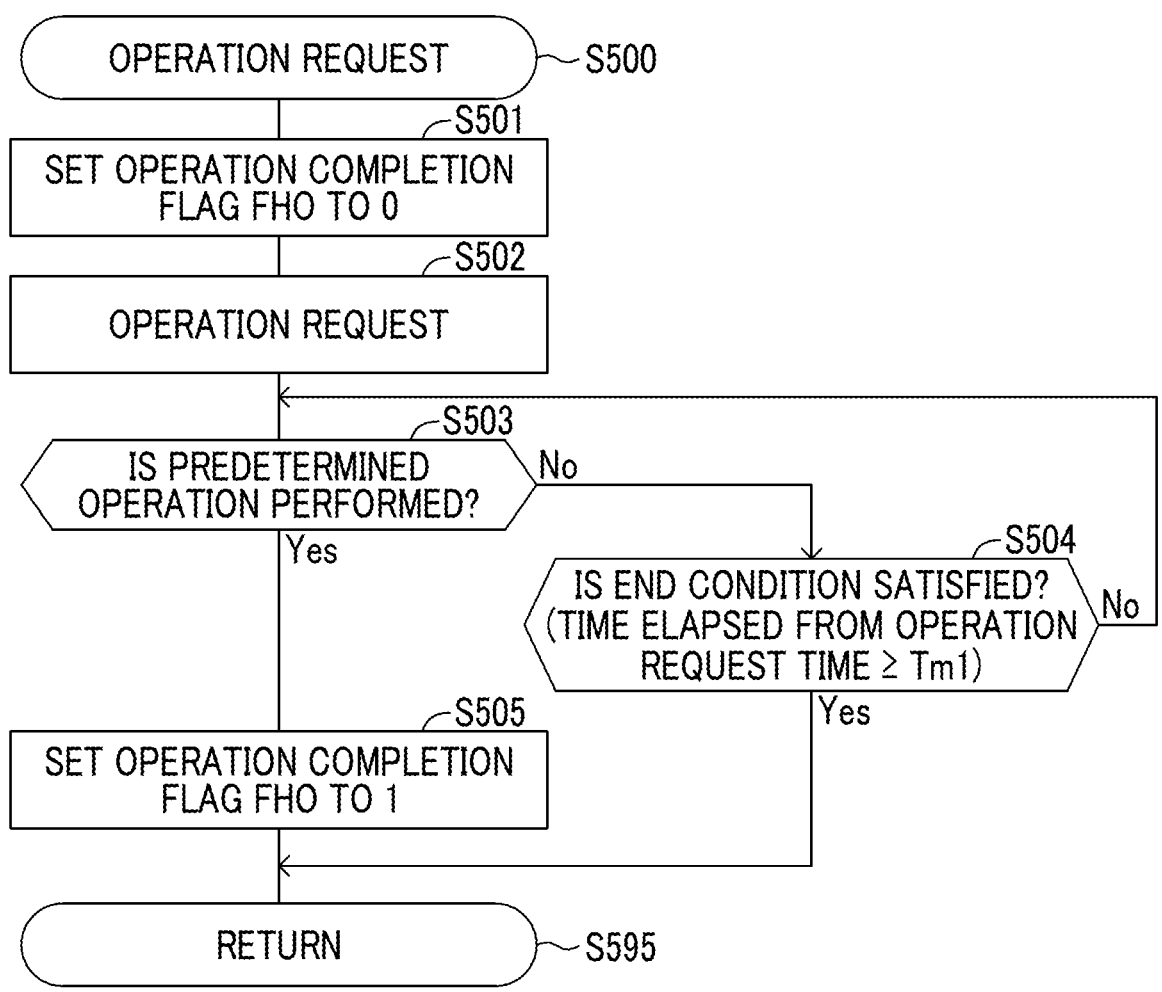
FIG. 5 is a flowchart showing an "operation request routine" executed by the CPU of the parking assistance ECU shown in FIG. 1.

Meanwhile, when the current position of the shift lever does not coincide with the designated position, the CPU determines "NO" in step S207 and the process proceeds to step S208. In step S208, the CPU requests the driver to "change the position of the shift lever" by executing an "operation request routine", which is shown in FIG. 5 and will be described below.

Next, in step S209, the CPU determines whether or not the value of an operation completion flag FHO is "1". The value of "0" of the operation completion flag FHO indicates that the driver does not perform a predetermined operation (here, "change of the position of the shift lever") during executing the "operation request routine", and the value of "1" thereof indicates that the driver performs a predetermined operation during executing the "operation request routine".

When the value of the operation completion flag FHO is not "1", the CPU determines "NO" in step S209, and the process is performed sequentially in steps S213 to S214 to be described below. Then, the process proceeds to step S295 to temporarily end the routine by the CPU.

Step S213: The CPU causes the touch panel 73 to display a message notifying that the parking assistance control is not started, and causes the speaker 92 to speak the message.

Step S214: The CPU sets the value of the request flag FHS to "0".

In this case, since the value of an assistance execution flag (hereinafter, referred to as "execution flag") FHE to be described below is maintained at "0", thus the parking assistance control is not started (refer to the determination of "NO" in step S301 in FIG. 3).

On the other hand, when the value of the operation completion flag FHO is "1", the CPU determines "YES" in step S209 and the process proceeds to step S210.

When the process proceeds to step S210, the CPU requests the driver to "release the brake pedal" by executing the "operation request routine" shown in FIG. 5.

Next, in step S211, the CPU determines whether or not the value of the operation completion flag FHO is "1". When the value of the operation completion flag FHO is not "1" (that is, the driver does not release the brake pedal), the process is performed sequentially in steps S213 and S214 as described above, and proceeds to step S295 to temporarily end the routine. Therefore, also in this case, since the value of the execution flag FHE is maintained at "0", the parking assistance control is not started.

On the other hand, when the value of the operation completion flag FHO is "1" (that is, the driver releases the brake pedal), the CPU determines "YES" in step S211 and the process proceeds to step S212 to set the value of the execution flag FHE to "1". Then, the process proceeds to step S295 to temporarily end the routine by the CPU. Thereby, the parking assistance control is started (refer to the determination of "YES" in step S301 in the routine of FIG. 3 to be described below).

Figure 3:
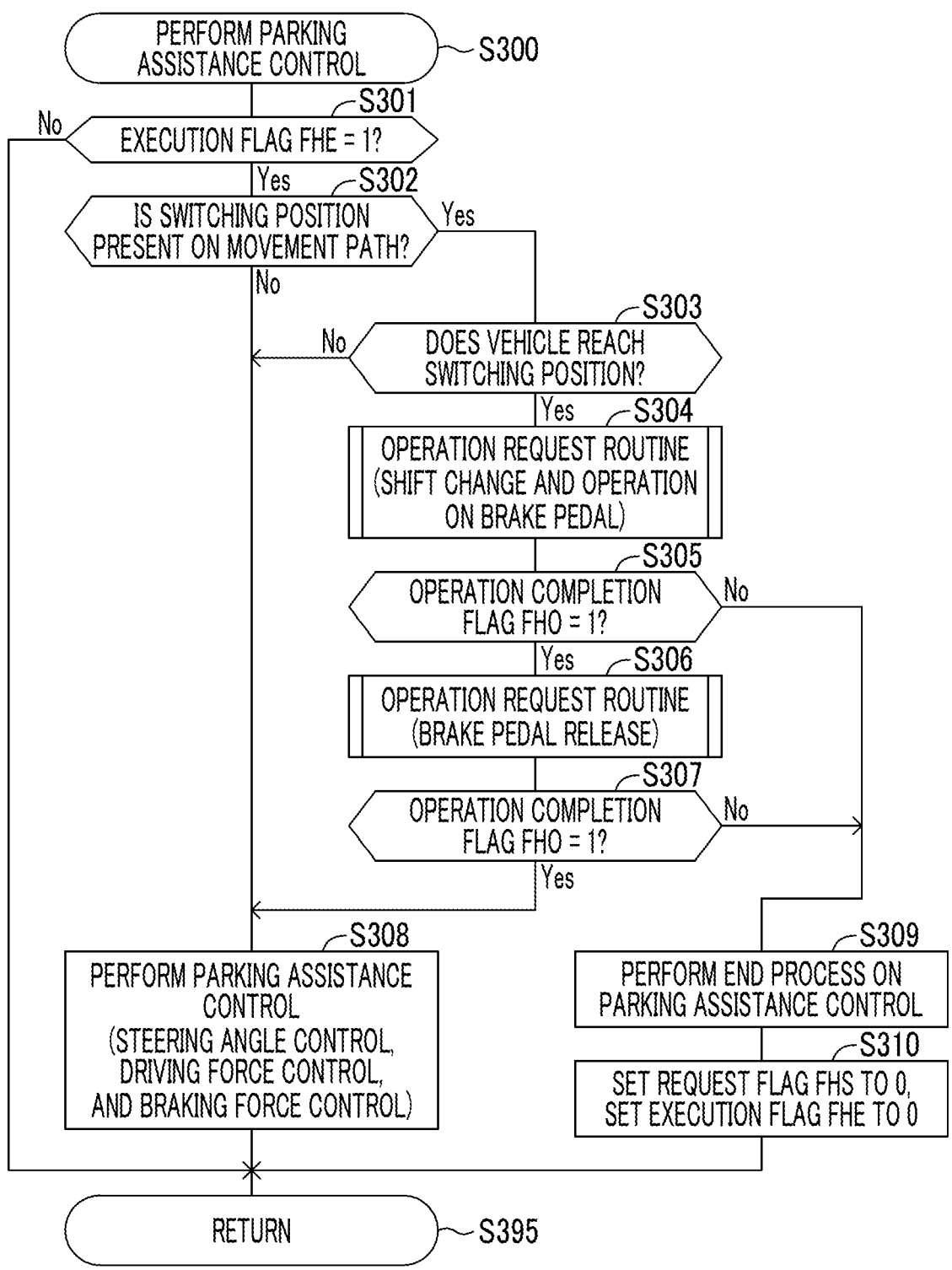
FIG. 3 is a flowchart showing a "parking assistance control executing routine" executed by the CPU of the parking assistance ECU shown in FIG. 1.

Further, at a predetermined timing, the CPU starts a process from step S300 in FIG. 3, and the process proceeds to step S301, determining whether or not the value of the execution flag FHE is "1". When the value of the execution flag FHE is not "1", the CPU determines "NO" in step S301, and the process proceeds directly to step S395 to temporarily end the routine. In this case, the parking assistance control is not performed.

On the other hand, when the value of the execution flag FHE is "1", the CPU determines "YES" in step S301 and the process proceeds to step S302 to determine whether or not a switching position is present on the movement path. When the switching position is not present on the movement path, the CPU determines "NO" in step S302 and the process proceeds to step S308 to perform parking assistance control. Specifically, the CPU performs steering angle control according to the steering angle pattern. Further, the CPU performs driving force control and braking force control according to the speed pattern. Therefore, the driver can move the vehicle to the target area (move the position of the vehicle to the target position) without operating the steering wheel, the accelerator pedal, and the brake pedal by themselves. When the driver makes a request for a large braking force by operating the brake pedal at the time when step S308 is executed, the brake actuator 31 is controlled such that a braking force corresponding to the request is generated. Further, in that case, the driving force of the vehicle is set to zero by controlling the engine actuator 21. Then, the process proceeds to step S395 to temporarily end the routine by the CPU.

Meanwhile, when the switching position is present on the movement path at the time when the process proceeds to step S302 (for example, see the example of FIG. 6), the CPU determines "YES" in step S302, and the process proceeds to step S303 to determine whether or not the vehicle reaches the switching position. When the vehicle does not reach the switching position, the CPU determines "NO" in step S303 and the process proceeds to step S308 to perform the parking assistance control as described above. Then, the process proceeds to step S395 to temporarily end the routine by the CPU.

On the other hand, it is assumed that the vehicle SV reached the switching position Psw in the example shown in FIG. 6. In this case, the CPU determines "YES" in step S303 and the process proceeds to step S304. After this point (the point at which the vehicle SV reaches the switching position Psw), the CPU applies a braking force to the vehicle SV by the braking force control to stop the vehicle SV.

In step S304, the CPU requests the driver to change the position of the shift lever and "operate on the brake pedal (depress the brake pedal)" by executing the "operation request routine" shown in FIG. 5. In the example of FIG. 6, "the change of the position of the shift lever" is a change from the forward position (D) to the reverse position (R). In this case, the CPU causes the touch panel 73 to display a "message requesting that the position of the shift lever is to be changed from (D) to (R)" and the speaker 92 to speak the message in step S502 of the routine of FIG. 5. In addition, in step S502, the CPU causes the touch panel 73 to display "a message requesting that the brake pedal is to be depressed" and the speaker 92 to speak the message.

Next, in step S305, the CPU determines whether or not the value of the operation completion flag FHO is "1". When the value of the operation completion flag FHO is "1", the CPU determines "YES" in step S305 and the process proceeds to step S306. In step S306, the CPU requests the driver to "release the brake pedal" by executing the "operation request routine" shown in FIG. 5. Next, in step S307, the CPU determines whether or not the value of the operation completion flag FHO is "1". When the value of the operation completion flag FHO is "1", the CPU determines "YES" in step S307, and the process proceeds to step S308 to perform the parking assistance control as described above. Therefore, the CPU eliminates the braking force applied to the vehicle SV, and applies a driving force to the vehicle SV such that the vehicle SV travels along the movement path (specifically, the second path LtgtB).

As described above, with the present parking assistance device, at the time when the vehicle SV reaches the switching position Psw, it is possible to confirm the intention of restarting (continuing) the parking assistance control to the driver by causing the driver to perform both the moving operation on the shift lever and the operation on the brake pedal. Furthermore, since the parking assistance control is restarted at the timing when the driver stops (releases) the operation on the brake pedal, it is possible to start the vehicle SV from the switching position Psw at the timing intended by the driver.

When the value of the operation completion flag FHO is not "1" at the time when the process proceeds to step S305 (that is, when the driver does not perform either or both of changing the position of the shift lever and operating on the brake pedal within a predetermined period), the CPU determines "NO" in step S305, and the process is performed sequentially in steps S309 and S310, and then proceeds to step S395 to temporarily end the routine.

Step S309: The CPU performs a predetermined end process. Specifically, the CPU causes the touch panel 73 to display a message notifying that the parking assistance control is to be ended and the speaker 92 to speak the message. In addition, the CPU causes the touch panel 73 to display a "message requesting that the brake pedal is to be depressed" and the speaker 92 to speak the message. It is noted that the CPU continues the braking force control and stops the vehicle SV at the switching position Psw even during performing the operation request for the brake pedal. When the driver depresses the brake pedal, the processing of the next step S310 is performed by the CPU.

Step S310: The CPU sets both the value of the request flag FHS and the value of the execution flag FHE to "0".

Then, when the process starts the routine of FIG. 3 from step S300 again and proceeds to step S301, the CPU determines "NO" such that the parking assistance control is not performed. That is, the application of the braking force by the braking force control to stop the vehicle SV at the switching position Psw is released. As a result, the parking assistance control ends, and the driving of the vehicle can be handed over to the driver.

When the value of the operation completion flag FHO is not "1" at the time when the CPU proceeds to step S307 (that is, when the driver does not release the brake pedal), the CPU determines "NO" in step S307, and the process is performed sequentially in steps S309 and S310 as described above and then proceeds to step S395 to temporarily end the routine.

Figure 4:
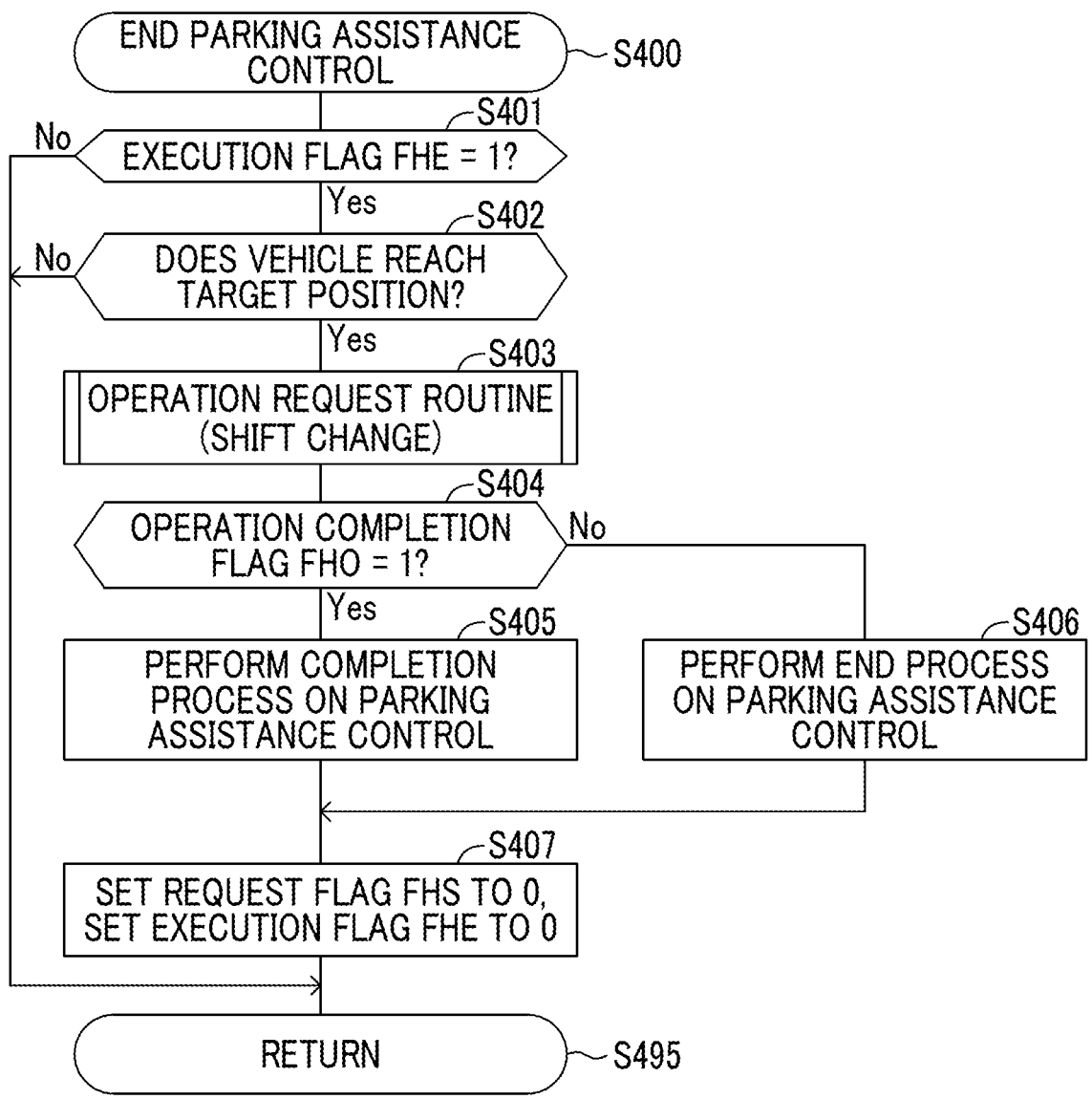
FIG. 4 is a flowchart showing a "parking assistance control ending routine" executed by the CPU of the parking assistance ECU shown in FIG. 1.

Further, at a predetermined timing, the CPU starts the process from step S400 in FIG. 4, and the process proceeds to step S401 to determine whether or not the value of the execution flag FHE is "1". When the value of the execution flag FHE is not "1", the CPU determines "NO" in step S401, and the process proceeds directly to step S495 to temporarily end the routine.

When the value of the execution flag FHE is "1", the CPU determines "YES" in step S401, and the process proceeds to step S402 to determine whether or not the vehicle reaches the target position (the vehicle reaches the target area). When the vehicle does not reach the target position, the CPU determines "NO" in step S402, and the process proceeds directly to step S495 to temporarily end the routine.

Meanwhile, in the example shown in FIG. 6, it is assumed that the vehicle SV reaches that target position Ptgt. In this case, the CPU determines "YES" in step S402 and the process proceeds to step S403. After this point (the point at which the vehicle SV reaches the target position Ptgt), the CPU applies a braking force to the vehicle SV by the braking force control to stop the vehicle SV at the target position Ptgt. In step S403, the CPU requests the driver to "change the position of the shift lever" by executing the "operation request routine" shown in FIG. 5. Here, the "change of the position of the shift lever" is a change from the reverse position (R) to the parking position (P).

Next, in step S404, the CPU determines whether or not the value of the operation completion flag FHO is "1". When the value of the operation completion flag FHO is "1" (when the position of the shift lever is changed from the reverse position (R) to the parking position (P)), the CPU determines "YES" in step S404, and the process is performed sequentially in steps S405 and S407 to be described below. Then, the process proceeds to step S495 to temporarily end the routine by the CPU.

Step S405: The CPU performs a predetermined completion process which is a final process of the parking assistance control. Specifically, the CPU causes the touch panel 73 to display a message notifying that the parking assistance control is completed and the speaker 92 to speak the message. Further, the CPU releases the application of the braking force by the braking force control to stop the vehicle SV at the target position Ptgt.

Step S407: The CPU sets both the value of the request flag FHS and the value of the execution flag FHE to "0".

On the other hand, when the value of the operation completion flag FHO is not "1" (when the position of the shift lever is not changed from the reverse position (R) to the parking position (P)), the CPU determines "NO" in step S404, and the process is performed sequentially in steps S406 and S407 to be described below. Then, the process proceeds to step S495 to temporarily end the routine by the CPU.

Step S406: The CPU performs a predetermined end process. Specifically, the CPU causes the touch panel 73 to display a message notifying that the parking assistance control is to be ended and the speaker 92 to speak the message. In addition, the CPU causes the touch panel 73 to display a "message requesting that the brake pedal is to be depressed" and the speaker 92 to speak the message. It is noted that the CPU continues the braking force control to stop the vehicle SV at the target position Ptgt even during performing the operation request for the brake pedal. When the driver depresses the brake pedal, the CPU releases the application of the braking force by the braking force control to stop the vehicle SV at the target position Ptgt.

Step S407: The CPU sets both the value of the request flag FHS and the value of the execution flag FHE to "0".

Next, the "operation request routine" shown in FIG. 5 will be described. When the process proceeds to step S208, step S210, step S304, step S306, and step S403, the CPU starts a process of the routine shown FIG. 5 from step S500, and the process is performed sequentially in steps S501 and S502 to be described below. Then, the CPU proceeds to step S503.

Step S501: The CPU sets the value of the operation completion flag FHO to "0".

Step S502: The CPU causes the touch panel 73 to display "a predetermined operation to be performed by the driver (for example, change of the position of the shift lever, operation on the brake pedal, release of the brake pedal, or the like)" and the speaker 92 to speak the message. That is, the CPU notifies the driver of the operation request.

Next, in step S503, the CPU determines whether or not the above predetermined operation (that is, driving operation corresponding to the operation request) is performed by the driver.

When the CPU performs the process in step S304, the CPU determines that the driving operation corresponding to the operation request is performed in any of the following cases.

(Case 1) The driver depresses the brake pedal after changing the position of the shift lever.

(Case 2) The driver changes the position of the shift lever after depressing the brake pedal.

When the driving operation corresponding to the operation request is performed, the CPU determines "YES" in step S503 and the process proceeds to step S505 to set the value of the operation completion flag FHO to "1". Then the process proceeds to step S595 to end the routine.

On the other hand, when the driving operation corresponding to the operation request is not performed, the CPU determines "NO" in step S503 and the process proceeds to step S504 to determine whether or not a predetermined end condition (cancel condition) is satisfied. The end condition is satisfied when the elapsed time from the time of the operation request (that is, the elapsed time after the notification of the operation request in step S502) is equal to or more than a first time threshold Tm1. When the end condition is not satisfied, the CPU determines "NO" in step S504 and the process returns to step S503.

On the other hand, when the end condition is satisfied, the CPU determines "YES" in step S504 and the process proceeds to step S595 to end the routine. In this case, the value of the operation completion flag FHO is "0". Therefore, in a subsequent step (one of step S209, step S211, step S305, step S307, and step S404), the CPU determines "NO". Accordingly, the parking assistance control is ended (cancelled).

As described above, with the present parking assistance device, it is possible to confirm the intention of restarting (continuing) the parking assistance control to the driver by causing the driver to perform both of the moving operation on the shift lever and the operation on the brake pedal at the time when the vehicle SV reaches the switching position Psw (step S304). Further, since the parking assistance control is restarted at the timing when the driver stops (releases) the operation on the brake pedal (YES in steps S306 and S307), it is possible to start the vehicle SV from the switching position Psw at the timing intended by the driver. When one or both of the moving operation on the shift lever and the operation on the brake pedal are not performed within a predetermined period (first time threshold Tm1) (NO in steps S304 and S503, YES in step S504, and NO in step S305) at the time when the vehicle SV reaches the switching position Psw, the parking assistance control is ended.

Specific Operation of Parallel Parking Assistance

The parking assistance control for the request for parallel parking assistance is the same as the parking assistance control of the perpendicular parking except that the areas (target areas) where the vehicle is to be finally moved are different from each other. Therefore, the routines of FIGS. 2 to 5 can be applied to the parking assistance control of the parallel parking. In this case, step S202 of the routine of FIG. 2 is changed to a process of determining whether or not the parallel parking mode is selected. Step S203 is changed to a process of determining whether or not both Conditions B3 and B4 described above are satisfied.

Specific Operation of Unparking Assistance

The parking assistance control for the request for unparking assistance is the same as the parking assistance control of the perpendicular parking except that the areas (target areas) where the vehicle is to be finally moved are different from each other. Therefore, the routines of FIGS. 2 to 5 can be applied to the parking assistance control of the unparking assistance. In this case, step S202 of the routine of FIG. 2 is changed to a process of determining whether or not the unparking mode is selected. Step S203 is changed to a process of determining whether or not both Conditions C3 and C4 described above are satisfied. For the unparking assistance, step S403 of the routine in FIG. 4 may be changed to a process of making a request for an operation on an accelerator pedal or a brake pedal. As yet another example, steps S403, S404, and S406 of the routine of FIG. 4 may be omitted.

The disclosure is not limited to the above embodiments, and it is possible to employ various modifications within the scope of the disclosure.

The notification regarding the parking assistance may be displayed on the display 51 instead of or in addition to the touch panel 73. The meter ECU 50 may display the notification regarding the parking assistance according to the display command transmitted from the parking assistance ECU 10. The display 51 may include a display dedicated to the parking assistance.

What is claimed is:

1. A parking assistance device comprising:
at least one sensor configured to acquire vehicle surrounding information including information on objects that are present around a vehicle and information on partitioning lines on a road surface around the vehicle; and
an electric control unit,
the electric control unit is configured to decide a target area that is occupied by the vehicle when parking or unparking of the vehicle is completed, based on the vehicle surrounding information, and decide a path allowing the vehicle to move from a current position of the vehicle to the target area as a movement path;
the electric control unit configured is to perform parking assistance control including steering angle control for changing a steering angle of the vehicle, driving force control for controlling a driving force of the vehicle and braking force control for controlling a braking force of the vehicle such that the vehicle moves from the current position to the target area along the decided movement path;
the electric control unit is configured to set a first path and a second path as the movement path when the vehicle is not possible to be moved to the target area by one backward or forward travel, the first path allowing the vehicle to move from the current position to a traveling direction switching position where a traveling direction of the vehicle is switched, the second path allowing the vehicle to move from the traveling direction switching position to the target area; and
the electric control unit is configured to, when the vehicle reaches the traveling direction switching position during performing the parking assistance control,
notify an occupant of a driving operation to be performed by the occupant with respect to the parking assistance control, including a moving operation on a shift lever and an operation on a brake pedal,
monitor whether or not the driving operation is performed by the occupant within a predetermined period after a notification,
restart the parking assistance control at a timing when the occupant stops the operation on the brake pedal, when the driving operation is performed by the occupant within the predetermined period, and
end the parking assistance control, when the driving operation is not performed by the occupant within the predetermined period.

2. The parking assistance device according to claim 1, wherein:
the electric control unit is configured to perform the braking force control for applying the braking force to the vehicle to stop the vehicle, after a time when the vehicle reaches the traveling direction switching position during performing the parking assistance control; and the electric control unit is configured to restart the parking assistance control at a timing when the occupant stops the operation on the brake pedal, and the electric control unit is configured to perform the braking force control for releasing an application of the braking force.

3. The parking assistance device according to claim 2, wherein the electric control unit includes a central processing unit.

4. The parking assistance device according to claim 2, wherein the notification of the occupant of the driving operation including the moving operation on the shift lever and the operation on the brake pedal includes displaying a first message requesting the moving operation of the shift lever on a display device and causing a speaker to speak the first message, and displaying a second message requesting the operation on the brake pedal on the display device and causing the speaker to speak the second message.

5. The parking assistance device according to claim 4, wherein the electric control unit includes a central processing unit.

6. The parking assistance device according to claim 1, wherein the electric control unit includes a central processing unit.

* * * * *